Patented Dec. 1, 1931

1,834,850

UNITED STATES PATENT OFFICE

WALTER KROPP, OF ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SCHIFF'S BASES DERIVED FROM ALPHA SUBSTITUTED CINNAMYLALDEHYDES

No Drawing. Application filed February 21, 1929, Serial No. 341,827, and in Germany August 6, 1925.

The present invention relates to the manufacture of technically valuable compounds obtainable by condensing alpha-beta-substituted acroleins with primary aromatic amines.

In accordance with the present invention, an alpha-beta-substituted acrolein, more particularly an acrolein of the general formula

wherein $R_1$ stands for an aryl radical and $R_2$ stands for an alkyl or aryl radical, is reacted upon by a primary aromatic amine as for example aniline, m- or p-toluidine, $\alpha$-naphthylamine and the like, if desired in the presence of a compound of the group comprising neutral and alkaline reacting condensing agents capable of binding water, for example sodium sulfate, potassium carbonate, sodium acetate, calcium chloride.

The reaction may advantageously be performed with molecular quantities of the aldehyde and the amine but in many cases it will be of advantage to use an excess of the aldehyde, which excess can easily be removed after the condensation according to known methods.

It has to be understood that one molecule of the aldehyde reacts with one molecule of the amine, regardless of the proportions used. The reaction already begins at room temperature and is in the most cases highly exothermic, so that an external heating will be unnecessary, but it may be mentioned, that the best results are obtained at temperatures between about 90–120° C. and that the character of the final products is somewhat dependent on the temperature employed as well as on the amount of the condensation agent used.

Instead of starting with the aldehydes themselves, there may be used such substances as yield the aldehydes during the raction, such as the oximes of the aldehydes or products having the character of the corresponding aldoles. Also it is possible to work in the presence of a suitable organic solvent, such as benzene, toluene, etc. without departing from the spirit of my invention.

The products thus obtainable form yellowish to reddish brown oils nearly insoluble in water, soluble in the usual organic solvents. They are excellent accelerators in vulcanization processes, especially in admixture with lamp black, for instance gas lamp black. The new products probably correspond to the general formula:—

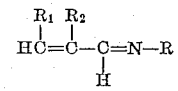

wherein $R$ and $R_1$ stand for aryl radicals, $R_2$ represents an akyl or aryl radical. It should however, be mentioned that the reaction products are generally not quite uniform and, furthermore, that the character of the same depends to a certain degree on the relative amounts of the starting materials as well as on the conditions, under which the condensation is carried out. For the use of the compounds as accelerators it is not necessary to employ them in a pure state. The new compounds may also be used in admixture with other accelerators. When an excess of the aldehyde has been used, the same may remain in the final product without considerably diminishing the accelerating action. Also when starting from an aldehyde in a rather impure state, the final product generally has the same good accelerating properties as the product obtained from the pure aldehyde. Moreover, my new products exert good aging properties.

The following examples will illustrate my invention, without limiting it thereto, the parts being by weight:

*Example 1.*—160 parts of alpha-ethyl-beta-phenyl-acrolein, having a boiling point of 243–245° C., are mixed with 85 parts of aniline, whereby the mass becomes warm. Then the mixture is heated for about 4 hours on the water bath. The water which has separated in the reaction is removed, and the oil is heated to about 130° C. in a vacuo of 10 mm. A reddish yellow oil remains which is insoluble in water, soluble in the most organic solvents. It has the boiling point of 195–200° C.

under a pressure of 11mm. The distilled oil has a yellowish color. The new product probably corresponds to the formula

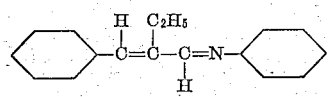

*Example 2.*—20 parts of alpha-n-amyl-beta-phenyl-acrolein, having a boiling point of 287–290° C. under atmospheric pressure, are mixed with 9 parts of aniline and heated for several hours to about 106° C. The water which has separated in the reaction is removed, and the oily residue is heated in a vacuo of about 10 mm. to a temperature of 130° C. The new product is a reddish yellow oil which is insoluble in water, soluble in benzene, alcohol, ether and other organic solvents. The new product probably corresponds to the formula

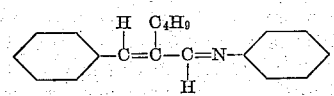

*Example 3.*—150 parts of alpha-methyl-beta-phenyl-acrolein, having a boiling point 248–249° C. under atmospheric pressure, are mixed with 90 parts of aniline and heated on the water bath for some hours. The water which has separated is removed, and the oily reaction mixture is heated in a vacuo of 8 mm. to a temperature of 120–130° C. for some hours. The new product probably corresponds to the formula

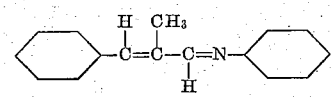

The condensation may be effected in the presence of an organic solvent, such as toluene. In this case, the solvent is advantageously distilled off in vacuo after the condensation.

*Example 4.*—16 parts of alpha-ethyl-beta-phenyl-acrolein are mixed with 10 parts of p-toluidine. The mixture is heated for about 3 hours on the water bath. Then the water which has formed in the process is separated from the oily condensation product and the new product is heated in a vacuo of 8 mm. to a temperature of 125–130° C. for about some hours. A reddish yellow oil is obtained which is soluble in organic solvents and insoluble in water. The new product probably corresponds to the formula

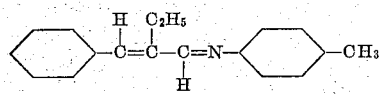

A similar product is obtained with m-toluidine.

*Example 5.*—16 parts of alpha-ethyl-beta-phenyl-acrolein, 8,5 parts of aniline and 5 parts of calcined potash are mixed and heated on the water bath for about 1–1½ hours. Then 100 parts of benzene are added, and the mass is filtered. From the filtrate, the benzene is distilled off, and the oily residue is heated in a vacuo of about 10 mm. to about 130° C. The new product probably corresponds to the formula

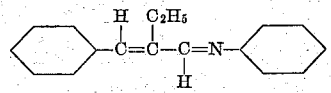

With phenyl-cinnamic aldehyde (compare Journal für praktische Chemie, [2], volume 97, page 281) a condensation product of similar properties is obtained, which probably corresponds to the formula

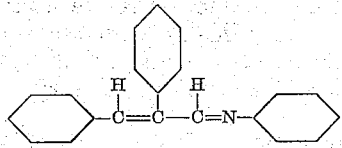

This is a continuation in part of my co-pending application Ser. No. 92,952, filed March 6, 1926.

I claim:

1. The process which comprises reacting upon alpha-ethyl-beta-phenyl-acrolein with aniline.

2. The process which comprises heating on a water bath a mixture of 160 parts by weight of alpha-ethyl-beta-phenyl-acrolein and 85 parts by weight of aniline for about 4 hours.

3. The process which comprises reacting upon an acrolein of the general formula:

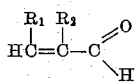

wherein $R_1$ stands for an aryl radical and $R_2$ represents an alkyl or aryl radical with a primary aromatic amine.

4. The process which comprises reacting upon an acrolein of the general formula:

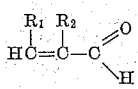

wherein $R_1$ stands for an aryl radical and $R_2$ represents an alkyl or aryl radical with a primary aromatic amine in the presence of a substance of the group consisting of neutral and alkaline condensing agents being capable of binding water.

5. The process which comprises reacting upon an acrolein of the general formula:

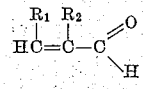

wherein $R_1$ stands for an aryl radical and $R_2$ represents an alkyl or aryl radical with a primary aromatic amine in the presence of a water-binding agent of the group consisting of sodium sulfate, sodium acetate, potassium carbonate and calcium chloride.

6. The process which comprises reacting upon an acrolein of the general formula:

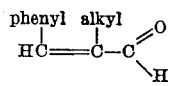

with a primary amine of the benzene series.

7. The process which comprises reacting upon an acrolein of the general formula:

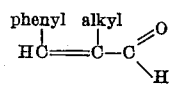

with a primary amine of the benzene series in the presence of a substance of the group consisting of neutral and alkaline condensing agents being capable of binding water.

8. The new products of the probable general formula

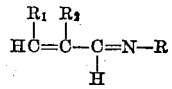

wherein R and $R_1$ stand for a phenyl radical, $R_2$ represents an alkyl or phenyl radical, said compounds being generally yellowish to reddish brown oils, nearly insoluble in water, soluble in organic solvents and being valuable accelerators in vulcanizing processes, which products are substantially identical with the compounds obtainable according to the process as claimed in claim 3.

9. The new products of the probable formula

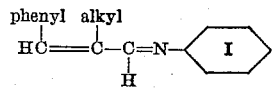

wherein the benzene nucleus marked I may be substituted by methyl groups, said compounds being generally yellowish to reddish brown oils, nearly insoluble in water, soluble in organic solvents and being valuable accelerators in vulcanizing processes, which products are substantially identical with the compounds obtainable according to the process as claimed in claim 6.

10. The new product of the probable formula

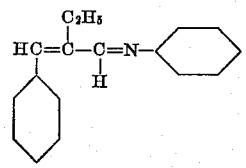

said product being a reddish yellow oil, having a boiling point between 195° and 200° C. under a pressure of 11 mm., being nearly insoluble in water, soluble in organic solvents and being a valuable accelerator in vulcanizing processes, which product is substantially identical with the compound obtainable according to the process as claimed in claim 1.

In testimony whereof I have hereunto set my hand.

WALTER KROPP. [L. S.]